(12) United States Patent
Klüber (10) Patent No.: US 11,424,082 B2
(45) Date of Patent: Aug. 23, 2022

(54) STORAGE UNIT FOR ELECTRICAL ENERGY, METHOD FOR MONITORING A STORAGE UNIT OF THIS KIND AND VEHICLE

(71) Applicant: Siemens Aktiengesellschaft, Munich (DE)

(72) Inventor: Thomas Klüber, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/253,011

(22) PCT Filed: Jun. 12, 2019

(86) PCT No.: PCT/EP2019/065276
§ 371 (c)(1),
(2) Date: Dec. 16, 2020

(87) PCT Pub. No.: WO2019/243120
PCT Pub. Date: Dec. 26, 2019

(65) Prior Publication Data
US 2021/0118623 A1   Apr. 22, 2021

(30) Foreign Application Priority Data

Jun. 19, 2018   (EP) .................................... 18178574

(51) Int. Cl.
*H01G 11/18*   (2013.01)
*A62C 3/16*   (2006.01)
(Continued)

(52) U.S. Cl.
CPC ............... *H01G 11/18* (2013.01); *A62C 3/16* (2013.01); *B61C 3/02* (2013.01); *B61C 17/06* (2013.01);
(Continued)

(58) Field of Classification Search
CPC .. H01G 11/18; A62C 3/02; B61C 3/02; B61C 17/06; H01M 10/486; H01M 2200/10; H01M 2220/20; H02H 5/04
See application file for complete search history.

(56) References Cited

U.S. PATENT DOCUMENTS 3,460,019 A   8/1969 Mas
5,489,836 A   2/1996 Yuen
(Continued)

FOREIGN PATENT DOCUMENTS

CN   106654397 A   5/2017
DE   31 51 469 A1   7/1983
(Continued)

OTHER PUBLICATIONS

PCT International Search Report and Written Opinion of International Searching Authority dated Jan. 8, 2019 corresponding to PCT International Application No. PCT/EP2019/065276 filed Jun. 12, 2019.

*Primary Examiner* — Robert J McCarry, Jr.
(74) *Attorney, Agent, or Firm* — Henry M. Feiereisen LLC (57) ABSTRACT

A frequency converter includes a storage element for storing electrical energy and a detector connected to the storage element and including a pressure sensor and a temperature sensor. The detector detects a physical variable in immediate vicinity of the storage element and provides a signal in accordance with an electrical resistance of the detector when a predefinable change over time of the physical variable is exceeded, with the electrical resistance representing an output of the detector. A housing encloses or substantially encloses the detector and the storage element. Communicating with the detector is an evaluation facility to detect the predefinable change over time of the physical variable. The evaluation facility and/or the detector is/are connected to a (Continued)

higher-level security system designed to decouple and/or to divert the electrical energy from the storage element when the predefinable change over time of the physical variable is exceeded.

10 Claims, 3 Drawing Sheets

(51) Int. Cl.
    *B61C 3/02*     (2006.01)
    *B61C 17/06*     (2006.01)
    *H01M 10/48*     (2006.01)
    *H02H 5/04*     (2006.01)

(52) U.S. Cl.
    CPC ............ *H01M 10/486* (2013.01); *H02H 5/04* (2013.01); *H01M 2200/10* (2013.01); *H01M 2220/20* (2013.01)

(56) References Cited

U.S. PATENT DOCUMENTS

| | | | |
|---|---|---|---|
| 2005/0191542 A1* | 9/2005 | Bushong | ............... H01M 10/48 429/50 |
| 2013/0122332 A1 | 5/2013 | van Lammeren et al. | |
| 2015/0207119 A1 | 7/2015 | Onodera et al. | |
| 2016/0315360 A1 | 10/2016 | Dickinson | |
| 2018/0026315 A1 | 1/2018 | Hinterberger et al. | |

FOREIGN PATENT DOCUMENTS

| | | |
|---|---|---|
| DE | 2014 10 204 985 A1 | 3/2014 |
| DE | 10 2013 204 529 A1 | 9/2014 |
| DE | 10 2015 002 149 A1 | 8/2016 |
| KR | 20170030256 A | 3/2017 |
| RU | 2387054 C2 | 4/2010 |
| RU | 2573411 C1 | 1/2016 |

* cited by examiner

STORAGE UNIT FOR ELECTRICAL ENERGY, METHOD FOR MONITORING A STORAGE UNIT OF THIS KIND AND VEHICLE

CROSS-REFERENCES TO RELATED APPLICATIONS

This application is the U.S. National Stage of International Application No. PCT/EP2019/065276, filed Jun. 12, 2019, which designated the United States and has been published as International Publication No. WO 2019/243120 A1 and which claims the priority of European Patent Application, Serial No. 18178574.2, filed Jun. 19, 2018, pursuant to 35 U.S.C. 119(a)-(d).

BACKGROUND OF THE INVENTION

The invention relates to a storage unit for electrical energy and a method for monitoring a storage unit of this kind. Furthermore, the invention relates to a vehicle, in particular a rail vehicle.

Storage units for electrical energy, such as a rechargeable battery or a capacitor, can cause severe damage in the event of a short circuit or other malfunction. Accordingly, monitoring for an increase in temperature in the immediate vicinity of a storage unit of this kind is already prior art.

DE 10 2014 204 965 A1 describes a method for the detection of anomalies in a battery cell and a short circuit sensor system.

US 2013-0122332 A1 moreover discloses a system with an integrated circuit, a pressure sensor and a communication apparatus for integration in a battery cell.

In particular, a quick response to a malfunction is important for storage units for storing electrical energy. It is therefore the object of the invention to recognize the detection of a malfunction in a storage unit quickly and reliably.

SUMMARY OF THE INVENTION

The object is achieved by a storage unit as set forth hereinafter. The object is further achieved by a method for monitoring a storage unit as set forth hereinafter.

Finally, the object is achieved by a vehicle, in particular a rail vehicle or a frequency converter with a storage unit of this kind.

The storage unit for electrical energy has at least one storage element for storing electrical energy, for example a rechargeable battery or a capacitor, wherein a means for detecting physical variables, in particular a pressure or a temperature, is assigned to the storage element in the immediate vicinity, wherein the means for detecting the physical variable is designed to detect a change over time of the physical variable, wherein the means for detecting the physical variable is designed to provide a signal when a predefinable change over time of the physical variable is exceeded.

The storage unit is preferably designed as a capacitor board in a frequency converter. An intermediate circuit capacitor is often designed as such a capacitor board. The storage unit can also be designed as a rechargeable battery or as a battery. The storage elements are particularly suitable for the short-term storage of electrical energy.

The storage unit is preferably arranged in a housing.

The storage element is preferably designed as an electronic component for the temporary storage of electrical energy. For example, such a storage element is designed as a capacitor, as a Super Cap, as a battery cell or as a rechargeable battery cell.

The means for detecting the physical variable is preferably designed as a sensor for the temperature and/or as a sensor for the pressure. The means for detecting the physical variable is preferably designed to provide a signal. As an alternative or in addition, the means for detecting the physical variable is designed as a variable electrical resistance. The electrical resistance preferably decreases in a measurable manner in the event of a sharp increase in the physical variable. The resistance represents the output of the means.

An assignment in the immediate vicinity is understood in particular as meaning that the means for detecting a physical variable is positioned on a surface of the storage element,
is positioned between two storage elements in each case,
is positioned in the immediate vicinity of a storage element,
is integrated in the storage element or
is positioned in a housing with the storage element.

As a result of the position of the means for detecting the physical variable, for example, an increase in the pressure originating from the storage element in the event of a malfunction can be quickly and reliably detected.

In addition to detecting the change in the physical variable, the respective absolute physical variable can also be detected. The predefinable change over time can be a function of the absolute variable. For example, a predefinable increase in temperature or pressure over time can be higher in the event of a high ambient pressure or a high ambient temperature than in a normal state (20 degrees Celsius, 1 atm.).

If necessary, an energy supply can be assigned to the means for detecting a physical variable. The means and the energy supply advantageously form a structural unit.

The means can be positioned on the surface of the storage element or in the immediate vicinity for detecting the physical variable in the immediate vicinity of the storage element. The means for detecting the physical variable is preferably fastened to the storage element using a fastening means.

The fastening means preferably comprises an adhesive bond or a clamp connection or is designed as such.

A volatile or non-volatile data memory can be assigned to the means for detecting, in particular for detecting the change of the physical variable over time.

The electrical resistance of the means for detecting the physical variable is preferably approximately zero when the predefinable change over time is exceeded. The means for detecting the physical variable is accordingly designed as a changeable resistance. A current advantageously flows unhindered through the means for detecting the physical variable insofar as an increase of the physical variable over time is detected.

A predefinable change over time of the physical variable is understood to mean, in particular, a value for the change over time which only occurs in the event of a malfunction of the storage element or the storage unit.

For example, in the event of a short circuit in a capacitor, a brief increase in pressure can be detected in the housing of the capacitor. This increase in pressure is greater than an increase in pressure that occurs, for example, as a result of a natural increase in pressure (due to changing weather conditions).

Likewise, in the event of a malfunction of a storage unit an increase in temperature may occur that goes beyond an externally induced increase in temperature. By detecting such an increase in temperature through the means for detecting the physical variable (temperature), a malfunction of a storage element or of the storage unit can be determined reliably and quickly.

The predefinable change of the physical variable over time is preferably a value which, in terms of magnitude, is greater than a value of the natural change over time of the physical variable.

The signal can be a TTL signal (transistor-transistor-logic signal), wherein the signal is made available to a higher-level security system.

Such a storage unit, which is equipped with such a means for detecting the physical variable, allows a malfunction to be determined quickly and, above all, reliably. The invention accordingly contributes to the reliable operation of the storage unit.

In the method for monitoring a storage unit for electrical energy for a malfunction, in particular a short circuit, the energy store comprises one or more storage elements, wherein a means for detecting a physical variable is assigned to the respective storage element, wherein the means for detecting the physical variable detects a change over time of the physical variable, wherein the means for detecting the physical variable provides a signal or has an electrical resistance when a predefinable change over time of the physical variable is exceeded.

A malfunction is understood to mean, in particular, a short circuit, overheating of a storage element. Moreover, deflagration in a storage element may be the result of a malfunction, for example a short circuit.

In the event of a short circuit in a capacitor or a battery, a reaction gas is generally released within a short time or there is a rapid increase in temperature. Both phenomena lead to a rapid increase in pressure over time in the immediate vicinity of the respective storage element. This increase in pressure over time can be detected with the means for detecting the physical variable, lithe change over time of the physical variable, in particular of the pressure, is exceeded, a malfunction can be inferred.

By means of the method, a malfunction can be rapidly and reliably determined.

The means for detecting the physical variable or the further means for detecting a further physical variable is designed as a pressure sensor or as a temperature sensor.

The means for detecting the physical variable preferably comprises a temperature sensor and/or a pressure sensor.

The means for detecting the physical variable is preferably used directly for detecting the change in temperature over time and/or for directly detecting the change in pressure over time.

By determining the pressure and/or the temperature, a malfunction of the storage unit can be inferred in a particularly simply and reliable manner.

In a further advantageous embodiment of the invention, the signal is designed in accordance with an electrical resistance of the means for detecting the physical variable.

In an advantageous embodiment of the means for detecting the physical variable, the electrical resistance of the means is established according to the physical variable and/or according to the change over time of the physical variable.

Thus, the electrical resistance of the means for detecting the physical variable can be proportional to the pressure or to the temperature.

Furthermore, the electrical resistance of the means for detecting the physical variable or the optionally assigned evaluation unit can be proportional to the change over time of the pressure or the temperature.

Through the embodiment of the means for detecting the physical variable and/or the evaluation facility as a variable electrical resistance, a malfunction can also be determined without an energy source or if the energy source for the means or for the evaluation facility fails.

As a result of this embodiment, security is increased by monitoring the storage unit.

In addition, the evaluation facility and/or the means for detecting a physical variable are connected to a higher-level security system.

In an advantageous embodiment of the invention, the means for detecting the physical variable and the storage element are arranged in an enclosed or essentially enclosed housing.

By arranging the respective storage elements in a housing, the storage elements can be spatially separated from further electronic assemblies to protect the assemblies. By positioning the means for detecting the physical variable, the temperature or the pressure can be determined with increased accuracy as the housing shields the respective storage element and the means for detecting the physical variable from the surroundings.

In a further advantageous embodiment of the invention, an evaluation facility is assigned to the means for detecting the physical variable, wherein an energy source is assigned to the evaluation facility and/or the means for detecting the physical variable, and the energy source is provided for supplying the means for detecting the physical variable and/or the evaluation facility with electrical energy.

The evaluation facility is preferably provided with the means for detecting the physical variable as an encapsulated unit. The energy source can preferably also be integrated into the encapsulated unit. Such an encapsulated unit can be integrated into an existing storage unit in a simplified manner. Such an encapsulated unit can be integrated into a storage element itself.

With this unit, the means for detecting the physical variable and the evaluation unit can be retrofitted in an existing storage unit and/or an already existing storage element.

The evaluation unit preferably determines the physical variable and/or detects the change over time of the physical variable detected by the means. The change over time can be provided as a signal to a higher-level security system. The evaluation facility is preferably set up in such a way that a signal is only provided to the physical variable when the predefinable change over time is exceeded. Instead of a signal, the evaluation facility or the means for detecting the physical variable can also be designed as a changeable electrical resistance, wherein the electrical resistance of the evaluation facility or the means for detecting the electrical variable has a predefinable electrical resistance, insofar as the change over time of the physical variable exceeds the predefinable change over time in terms of magnitude.

The energy source serves to supply the evaluation facility and/or the means for detecting the physical variable with electrical energy.

With the proposed encapsulated unit, an already existing storage unit can be retrofitted in a particularly simple manner.

In a further advantageous embodiment of the invention, the means for detecting a physical variable is integrated into the storage element.

The means for detecting the physical variable is advantageously designed as a film-like or as a flat and flexible structure.

Due to the flat and flexible design of the means for detecting the physical variable, integration into a storage element can easily take place.

Alternatively, the means for detection can be designed in an encapsulated manner. Advantageously, encapsulation is carried out in such a way that the means for determining the physical variable can be easily attached to the surface or inside the storage element.

The means for detecting the physical variable can be encapsulated together with the evaluation facility and the energy source. The encapsulation can advantageously take place in such a way that a high fire protection class can be obtained for the encapsulated unit.

The higher-level security system is preferably designed as fire protection. The higher-level security system advantageously detects the electrical resistance of the means for detecting the physical variable and/or the electrical resistance of the evaluation facility. As an alternative or in addition, the higher-level security system has an input for the signal which provides the evaluation facility and/or the means for detecting the physical variable.

In the event of a malfunction, i.e. of a change of the physical variable over time in terms of magnitude beyond the predefinable change over time of the physical variable, the higher-level safety controller preferably serves to interrupt the energy supply of the storage element. The higher-level security system is advantageously used for the controlled discharge of the stored electrical energy from the storage unit or from the respective storage element.

By integrating the means for detecting the physical variable, a higher-level security system can be expanded in its function. Thus, the storage unit described here can be operated with improved security.

In a further advantageous embodiment of the invention, the storage unit is assigned, in addition to the means for detecting a physical variable and a further means for detecting a further physical variable, wherein the means and the further means for detecting the physical variable or the further physical variable are connected to the higher-level security system, wherein the means and the further means for detecting the physical means each have a specified electrical resistance when the predefinable change over time of the physical variable or a specified physical variable is exceeded, wherein the electrical resistance is detected by the higher-level security system, wherein the means for detecting the physical variable and the further means for detecting the further physical variable are electrically connected in parallel. In other words, the storage unit is assigned a further means for detecting a further physical variable, in particular a temperature, wherein the means and the further means for detecting the further physical variable are connected to the higher-level security system, wherein the means for detecting the physical variable when the predefinable change over time is exceeded and the further means for detecting the further physical variable when a predefinable value is exceeded or when a further predefinable change over time is exceeded each have a specified electrical resistance, wherein the electrical resistance is detected by the higher-level security system, wherein the means for detecting the physical variable and the further means for detecting the further physical variable are electrically connected in parallel.

The further means for detecting a physical variable is preferably designed as a temperature sensor, in particular as a fireproof cable.

The means for detecting a physical variable is preferably designed as a pressure sensor.

The pressure sensor is used to record rapidly rising pressure as a result of a malfunction in a storage element.

The means and the further means for detecting the physical variable are in each case preferably electrically connected in parallel. The total resistance of the series circuit thus changes as a function of the measured values of the means and of the further means. Critical faulty states can be securely and reliably detected by the parallel connection. This is of particular importance for an electrically operated rail vehicle.

In the case of a fireproof cable in combination with a pressure gauge, both means for detecting the physical variable are preferably designed as variable resistors. In the event of a malfunction, at least one of the electrical resistors changes. This change in the electrical resistance can be monitored by the higher-level security system. If the electrical resistance changes, a malfunction can be inferred, and the higher-level security system provides a warning signal and/or initiates the aforementioned steps.

In a further advantageous embodiment of the invention, the higher-level security system is designed to decouple and/or to divert the electrical energy from the respective storage element when the predefinable change over time of the physical variable is exceeded.

A decoupling of the respective storage element or the decoupling of the storage unit from the energy supply preferably takes place by separating the energy supply. The separation takes place in a particularly simple manner by means of a switch.

In the event of a malfunction, the energy stored in the respective storage element is preferably transferred to a load resistor. Thus, the risk of fire can be further reduced.

In a further advantageous embodiment of the invention, the signal is provided to a higher-level security system, wherein the higher-level security system prevents the supply of electrical energy to the respective storage element and/or removes the electrical energy from the respective storage element when the signal is received.

Here, as stated above, the signal can also be designed as an electrical resistance of the respective means for detecting the physical variable.

By means of the embodiment, a particularly fast-reacting detection of the malfunction of the storage unit can be registered.

In a further advantageous embodiment of the invention, an increase in pressure and/or temperature in the immediate vicinity of the respective storage element is detected with the aid of the means for detecting the physical variable.

The means for detecting the physical variable preferably detects the change over time of the temperature and/or the pressure directly.

The direct detection of a change over time is understood to mean the detection of the change in the physical variable without the use of a computing unit which performs a differentiation over time of the physical variable according to the time.

The respective storage element is preferably assigned its own means for detecting the physical variable.

As an alternative or in addition, at least one storage element is assigned to the respective means for detecting the physical variable.

By determining the change over time, in particular the increase in pressure and/or temperature, particularly reliable monitoring of a storage unit can take place. Explosions or significant heat development can thus be registered easily and reliably.

In a further advantageous embodiment of the invention, the means for detecting the physical variable has a known electrical resistance depending on the change in the physical variable, wherein the resistance is detected by the higher-level security system.

The known resistance is preferably close to zero or infinity, so that in the event of a malfunction of the storage unit, a current either flows largely unhindered or not. This is advantageously easy to verify.

On the other hand, setting a resistance to a certain finite positive value not equal to zero, for example approx. 100 ohms, can ensure particularly reliable monitoring of the storage unit. As a result, a "false alarm" is largely excluded.

As a result of the resistance, it is also possible to couple the outputs of two means, that is to say, the means and the further means, to one another in a simple manner. This can be done, for example, by a parallel circuit or a series circuit. The total resistance changes as a function of the measured values of the two means, and thus of the respective resistance of the corresponding means or further means.

An advantageous application of the invention described here is a vehicle, in particular a rail vehicle, with a storage unit described above.

The vehicle advantageously has an energy storage system for electrical energy, such as a battery. The invention can also be used advantageously for monitoring an intermediate circuit capacitor, in particular a unit having a plurality of capacitors.

The invention is used particularly advantageously in a rail vehicle such as a locomotive. The invention preferably serves to monitor an intermediate circuit memory in a frequency converter of the rail vehicle.

A further advantageous application of the invention is as a frequency converter, having a storage unit described here.

Such a storage unit can be an intermediate circuit capacitor of the frequency converter.

BRIEF DESCRIPTION OF THE DRAWING

The invention is described and explained in more detail hereinafter with reference to the figures. The features shown in the figures can be combined in the context of the invention to form new embodiments of the invention.

The figures show.

DETAILED DESCRIPTION OF PREFERRED EMBODIMENTS

Figure 1:
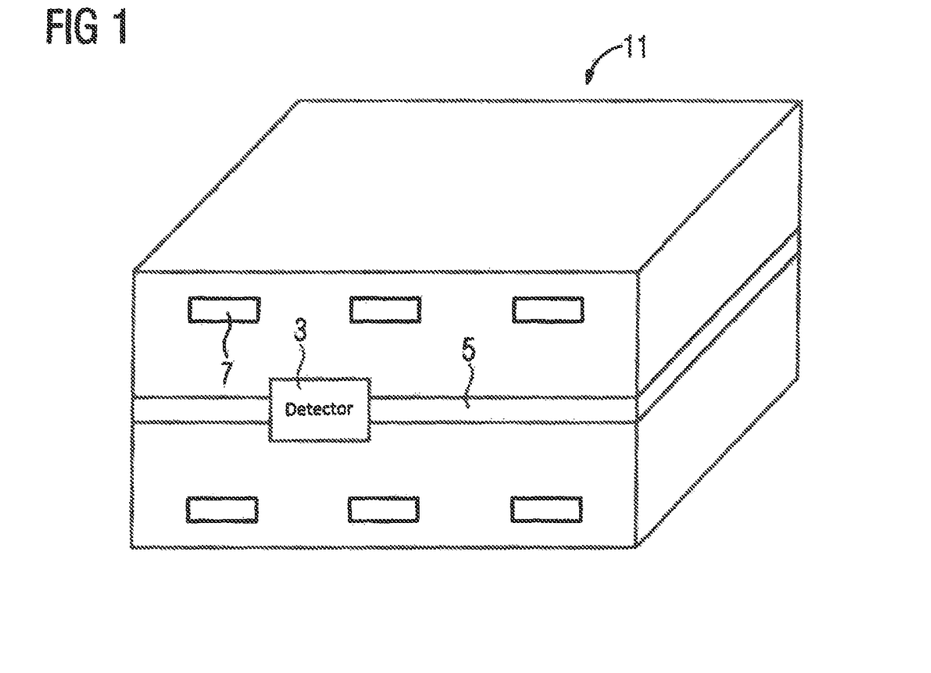
FIG. 1 An exemplary storage unit.
Figure 6:
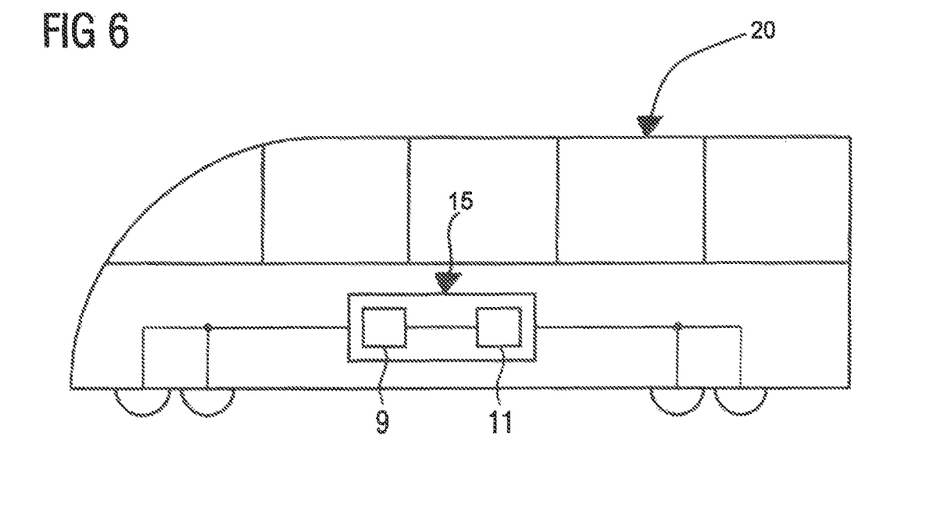

FIG. 1 shows an exemplary storage unit 11 which can be designed as a capacitor or as a battery (rechargeable battery) which can be accommodated in a frequency converter, generally designated by reference numeral 15 and installed in a rail vehicle by way of example, as shown schematically in FIG. 6. The storage unit 11 preferably comprises at least one storage element 1 (not shown). The storage element 1 comprises a plurality of connecting elements 7. The connecting elements 7 serve to supply and discharge electrical energy. A means for detecting a physical variable 3 is further assigned to the storage element 1.

The means 3 for detecting the physical variable can be designed as a pressure sensor and/or as a temperature sensor. A fastening means 5 is used for fastening the means 3 for detecting the physical variable. The means 3 for detecting the physical variable can also be integrated into the storage element 1, as shown hereinafter.

Figure 2:
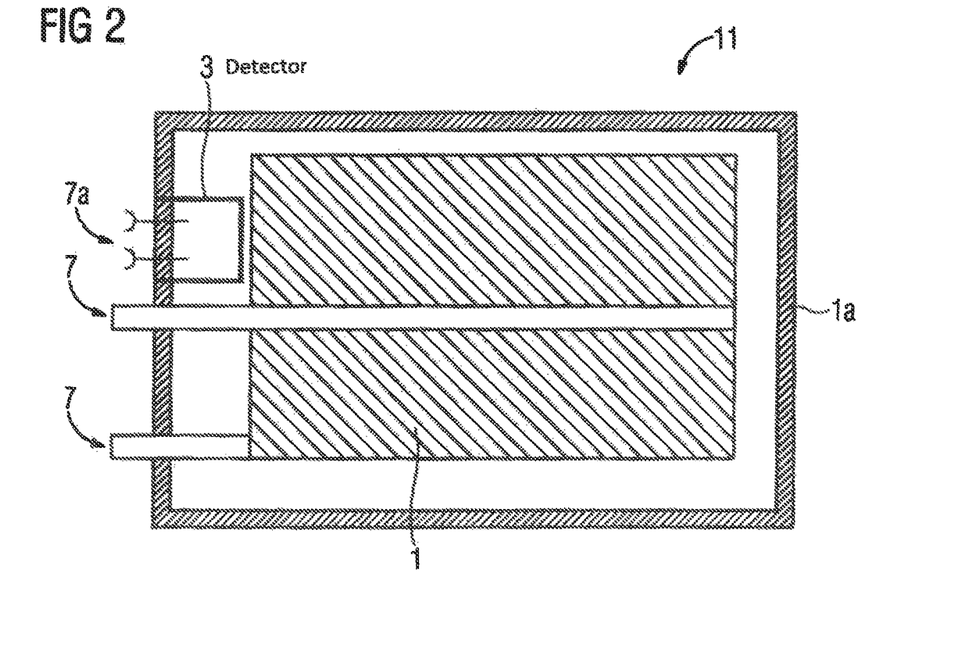
FIG. 2 An exemplary storage unit with an integrated means, for detecting a physical variable, FIG. 3 An exemplary storage unit, FIG. 4 An exemplary storage unit, FIG. 5 A possible circuit arrangement, and FIG. 6 A schematic illustration of an exemplary motor vehicle having incorporated therein a frequency converter in accordance with the invention.

FIG. 2 shows an exemplary storage unit 11 with an integrated means 3 for detecting a physical variable 1. The storage unit 11 shown here preferably has a capacitor as a storage element. The storage unit 11 comprises connecting elements 7 and a means 3 for detecting a physical variable. The means 3 for detecting the physical variable is integrated, together with the storage element 1, into a housing 1a or the cover of the storage unit 11 In addition, the means for detecting the physical variable 3 has its own connecting elements 7a, it being possible for the connecting elements 7a to be used for detecting the physical variable and for supplying power to the means for detecting the physical variable.

Figure 3:
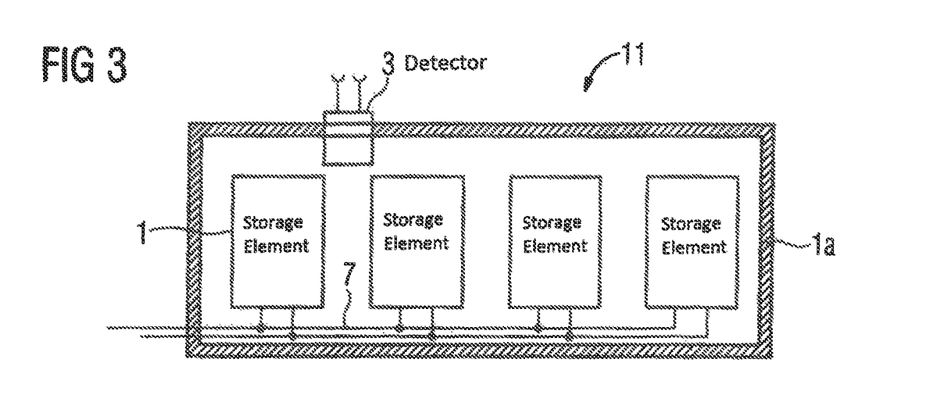

FIG. 3 shows a storage unit 11. The storage unit 11 comprises four storage elements 1, which are jointly integrated into a housing 1a of the storage unit 11. The means 3 for detecting the physical variable is also assigned to the housing 1a. The means 3 for detecting the physical variable is only accommodated in the same housing 1a as the storage elements 1 here. Accordingly, the means 3 for detecting the physical variable is preferably designed as a pressure measurement sensor or as a pressure sensor. In the event of a malfunction of one of the storage units 1, the pressure p increases within the housing 1a. This increase in pressure p over time is registered with the aid of the means 3 for detecting the physical variable.

Figure 4:
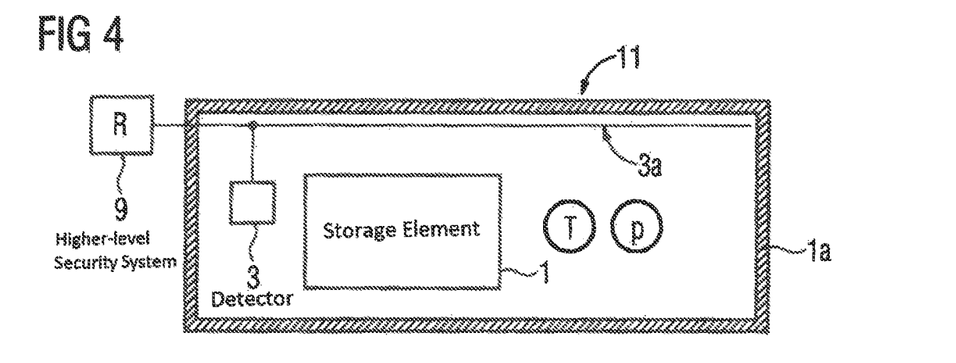

FIG. 4 shows an exemplary storage unit 11, The storage unit 11 comprises a housing 1a and a temperature sensor 3a in the form of a cable. Furthermore, the storage unit 11 shown comprises a means for detecting the physical variable 3. A higher-level security system 9 is used to determine the temperature T and/or a further physical variable, for example, the pressure p. The higher-level security system 9 detects the electrical resistance R of the temperature sensor and/or of the means 3 for detecting the physical variable. The means 3 for detecting the physical variable is designed in this exemplary embodiment in particular as a pressure sensor. In the event of a malfunction of the storage element 1, for example a short circuit in the storage element 1, there is a sudden increase in the pressure p in the housing 1a. The increase in the pressure p is registered by the means 3 for detecting the physical variable. The means 3 preferably provides a signal to the higher-level security system 9 in such a case. In the event of excessive heating of the storage element 11 due to the malfunction, the heat development is registered with the aid of the temperature sensor 3a. The higher-level security system 9 advantageously registers the increase in temperature T and, for example, disconnects the storage element from the power supply. The higher-level security system may provide a warning signal.

Figure 5:
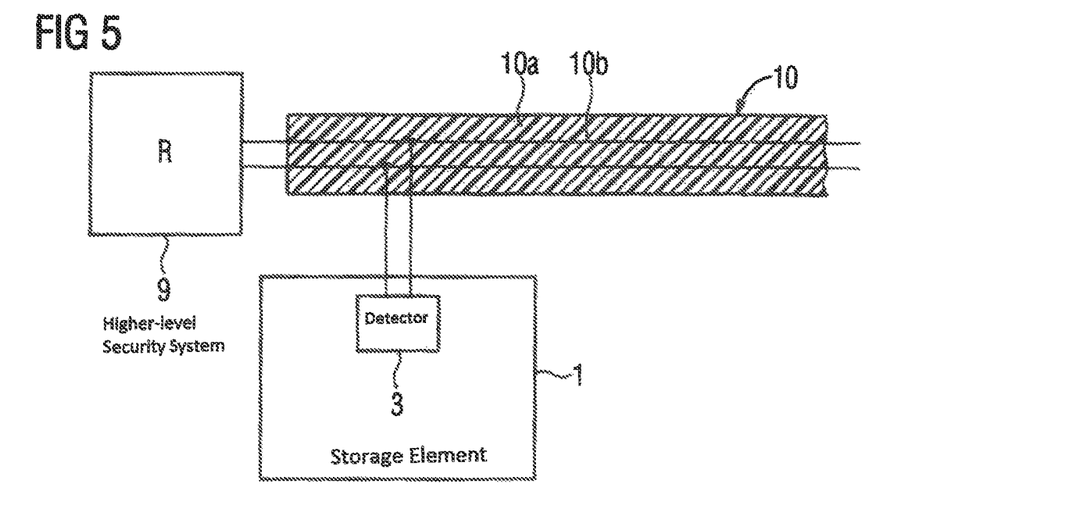

FIG. 5 shows a possible circuit arrangement. The circuit arrangement can be assigned to a storage unit 11 described here. The higher-level security system 9, which is used to detect the electrical resistance R of a fireproof cable 10, is shown. The fireproof cable 10 comprises a polymer layer 10a and two conductors 10b of the fireproof cable. The fireproof cable 10 serves as a temperature sensor 3a, When the temperature increases above a specified temperature, the polymer layer 10a of the fire protection cable melts and the conductors 10b of the fire protection cable may come into contact with one another. When the two conductors 10b of the fire protection cable 10 come into contact, the resistance R, which is detected with the aid of the higher-level security system 9, drops. The respective conductor 10b of the fireproof cable 10 is also connected in parallel to the means for detecting the physical variable 3, The means 3 for detecting the physical variable is designed as a pressure sensor 3a here. The means 3 for detecting the physical variable is as here to a storage element 1, in the event of a malfunction of the storage element 1, the physical variable, in particular the pressure p and/or the temperature T, changes in the storage element and in the immediate vicinity of the storage element 1. A change in the temperature T is registered by the fireproof cable 10. A change in the pressure p is registered by the means 3 far detecting the physical variable, in the event al a malfunction, the resistance R of the fireproof cable or of the means 3 for detecting the physical variable changes accordingly. The higher-level control facility 9 detects the change in the electrical resistance R and is able to provide a signal. In the event of a malfunction of the storage element 1, the power supply to the storage element is advantageously interrupted.

The embodiment shown is preferably arranged in an enclosed housing 11 or an essentially enclosed housing 11.

In summary, the invention relates to a storage unit 11 for electrical energy and a method for monitoring a storage unit of this kind 11. The storage unit 11 has at least one storage element 1 for the short-term storage of electrical energy, for example a rechargeable battery or a capacitor. A means 3 for detecting physical variables, in particular a pressure p or temperature T, in the immediate vicinity of the storage element 1 is assigned to the storage element 1, wherein the means 3 is designed to detect the physical variable, in particular to detect a change over time of the physical variable, wherein the means 3 for detecting the physical variable is designed to provide a signal when a predefinable change over time of the physical variable is exceeded. Use in an intermediate circuit capacitor in a rail vehicle is one advantageous use of the invention.

What is claimed is:

1. A frequency converter, comprising:
   a storage unit for electrical energy, said storage unit designed as an intermediate circuit capacitor and including a storage element for storing electrical energy;
   a detector including a pressure sensor and a temperature sensor which each have an electrical resistance;
   a housing designed to enclose or substantially enclose the detector and the storage element, wherein the detector is configured to detect a physical variable representing a pressure inside the housing, and a temperature inside the housing and provide a signal in accordance with an electrical resistance of the pressure sensor and the temperature sensor detector;
   an evaluation facility disposed inside the housing and configured to detect a predefinable change over time of the physical variable; and
   a security system designed as a fire protection system and connected to the evaluation facility and/or the detector, said security system designed to decouple and/or to divert the electrical energy from the storage element when the predefinable change over time of the physical variable is exceeded.

2. The frequency converter of claim 1, wherein the detector is integrated into the storage element.

3. The frequency converter of claim 1, further comprising a further detector configured to detect a further physical variable and connected to the security system, wherein the detector when the predefinable change over time is exceeded and the further detector when a predefinable value is exceeded or when a further predefinable change over time is exceeded each have a specified electrical resistance which is detected by the security system, and wherein the detector and the further detector are electrically connected in parallel.

4. The frequency converter of claim 3, wherein the further physical variable is a temperature.

5. A method for monitoring an intermediate circuit capacitor of a frequency converter for a malfunction, said method comprising:
   detecting by a detector inside a housing which encloses or substantially encloses the detector and the intermediate circuit capacitor a physical variable represented by an electrical resistance of a pressure sensor and of a temperature sensor;
   generating a signal in accordance with the electrical resistance of the detector when a predefinable change over time of the physical variable is exceeded;
   detecting by a security system the electrical resistance;
   interrupting an energy supply of the storage element by the security system when the signal is received; and
   discharging the stored energy from the intermediate circuit capacitor in a controlled manner.

6. The method of claim 5, further comprising detecting by the detector an increase in pressure and/or temperature in the immediate vicinity of the storage element.

7. A vehicle comprising a frequency converter, said frequency converter comprising a storage unit for electrical energy, said storage unit designed as an intermediate circuit capacitor and including a storage element for storing electrical energy; a detector including a pressure sensor and a temperature sensor which each have an electrical resistance; a housing designed to enclose or substantially enclose the detector and the storage element, wherein the detector is configured to detect a physical variable representing a pressure inside the housing and a temperature inside the housing and provide a signal in accordance with an electrical resistance of the pressure sensor and the temperature sensor detector; an evaluation facility disposed inside the housing and configured to detect a predefinable change over time of the physical variable; and a security system designed as a fire protection system and connected to the evaluation facility and/or the detector, said security system designed to decouple and/or to divert the electrical energy from the storage element when the predefinable change over time of the physical variable is exceeded.

8. The vehicle of claim 7, wherein the detector is integrated into the storage element.

9. The vehicle of claim 8, wherein the frequency converter includes a further detector configured to detect a further physical variable and connected to the higher-level security system, wherein the detector when the predefinable change over time is exceeded and the further detector when a predefinable value is exceeded or when a further predefinable change over time is exceeded each have a specified electrical resistance which is detected by the higher-level security system, and wherein the detector and the further detector are electrically connected in parallel.

10. The vehicle of claim 9, wherein the further physical variable is a temperature.

\* \* \* \* \*